United States Patent
Zhamu et al.

(10) Patent No.: US 8,728,679 B2
(45) Date of Patent: May 20, 2014

(54) LAMINATED EXFOLIATED GRAPHITE COMPOSITE-METAL COMPOSITIONS FOR FUEL CELL FLOW FIELD PLATE OR BIPOLAR PLATE APPLICATIONS

(75) Inventors: Aruna Zhamu, Centerville, OH (US); Jinjun Shi, Columbus, OH (US); Jiusheng Guo, Centerville, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 1002 days.

(21) Appl. No.: 11/807,379

(22) Filed: May 29, 2007

(65) Prior Publication Data

US 2008/0299419 A1 Dec. 4, 2008

(51) Int. Cl.
*H01M 8/24* (2006.01)
*B32B 7/02* (2006.01)

(52) U.S. Cl.
USPC .......................................... 429/457; 428/212

(58) Field of Classification Search
USPC .......................................... 428/212; 264/105
See application file for complete search history.

(56) References Cited

U.S. PATENT DOCUMENTS

| | | |
|---|---|---|
| 3,492,197 A | 1/1970 | Olstowski et al. |
| 4,265,952 A | 5/1981 | Caines |
| 4,530,949 A | 7/1985 | Atkinson et al. |
| 4,704,231 A | 11/1987 | Chung |
| 4,729,910 A | 3/1988 | Fukuda et al. |
| 4,946,892 A | 8/1990 | Chung |
| 5,300,370 A | 4/1994 | Washington et al. |
| 5,527,363 A | 6/1996 | Wilkinson et al. |
| 5,885,728 A | 3/1999 | Mercuri et al. |
| 6,037,073 A | 3/2000 | Besmann et al. |
| 6,037,074 A | 3/2000 | Mercuri et al. |

(Continued)

OTHER PUBLICATIONS

Cunningham et al. "Development of bipolar plates for fuel cells from graphite filled wet-lay material and a thermoplastic laminate skin layer", Dec. 28, 2006, Journal of Power Sources, vol. 165, pp. 764-773.*

(Continued)

*Primary Examiner* — Ula C Ruddock
*Assistant Examiner* — Daniel Gatewood
(74) *Attorney, Agent, or Firm* — Mark Levy; Thompson Hine LLP

(57) ABSTRACT

An electrically conductive laminate composition for fuel cell flow field plate or bipolar plate applications. The laminate composition comprises at least a thin metal sheet having two opposed exterior surfaces and a first exfoliated graphite composite sheet bonded to the first of the two exterior surfaces of the metal sheet wherein the exfoliated graphite composite sheet comprises: (a) expanded or exfoliated graphite and (b) a binder or matrix material to bond the expanded graphite for forming a cohered sheet, wherein the binder or matrix material is between 3% and 60% by weight based on the total weight of the first exfoliated graphite composite sheet. Preferably, the first exfoliated graphite composite sheet further comprises particles of non-expandable graphite or carbon in the amount of between 3% and 60% by weight based on the total weight of the non-expandable particles and the expanded graphite. Further preferably, the laminate comprises a second exfoliated graphite composite sheet bonded to the second surface of the metal sheet to form a three-layer laminate. Surface flow channels and other desired geometric features can be built onto the exterior surfaces of the laminate to form a flow field plate or bipolar plate. The resulting laminate has an exceptionally high thickness-direction conductivity and excellent resistance to gas permeation.

30 Claims, 6 Drawing Sheets

Top, core and bottom layers are connected in series.

(56) References Cited

U.S. PATENT DOCUMENTS

| | | |
|---|---|---|
| 6,171,720 B1 | 1/2001 | Besmann et al. |
| 6,248,467 B1 | 6/2001 | Wilson et al. |
| 6,432,336 B1 | 8/2002 | Mercuri et al. |
| 6,706,400 B2 | 3/2004 | Mercuri et al. |
| 6,746,771 B2 | 6/2004 | Öttinger et al. |
| 6,881,512 B2 | 4/2005 | Saito et al. |
| 6,939,638 B2 | 9/2005 | Saito et al. |
| 2001/0046560 A1 | 11/2001 | Fong et al. |
| 2002/0182387 A1* | 12/2002 | Mercuri et al. ............... 428/212 |
| 2004/0028993 A1* | 2/2004 | Jousse et al. ................... 429/44 |
| 2004/0229993 A1 | 11/2004 | Huang et al. |
| 2005/0116376 A1* | 6/2005 | Egami et al. .................. 264/105 |
| 2007/0015267 A1 | 1/2007 | Da Silva et al. |

OTHER PUBLICATIONS

U.S. Appl. No. 11/293,540, filed Dec. 5, 2005, Jang.
U.S. Appl. No. 11/293,541, filed Dec. 5, 2005, Jang, et al.
GrafTech trade brochure, "GrafCell: Fuel Cell Components—FFP Series," www.grafcell.com.

* cited by examiner

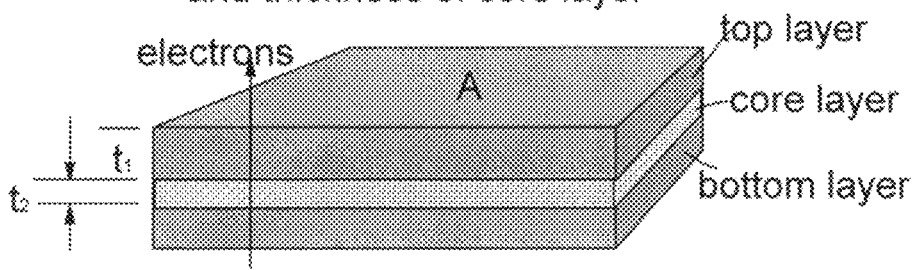

$\sigma_1, \rho_1, R_1, t_1$ = conductivity, resistivity, resistance and thickness of top or bottom layer $\sigma_2, \rho_2, R_2, t_2$ = conductivity, resistivity, resistance and thickness of core layer $R_1 = \rho_1 t_1 / A_1 \quad A_1 = A_2 = A_s$ $R_2 = \rho_2 t_2 / A_2$ $R_s = 2R_1 + R_2 = (2\rho_1 t_1 + \rho_2 t_2)/A_2 = \rho_s (2t_1 + t_2)/A_s$ $\rho_s = (2\rho_1 t_1 + \rho_2 t_2)/(2t_1 + t_2) \quad \sigma_s = 1/\rho_s$

FIG.2 Top, core and bottom layers are connected in series.

LAMINATED EXFOLIATED GRAPHITE COMPOSITE-METAL COMPOSITIONS FOR FUEL CELL FLOW FIELD PLATE OR BIPOLAR PLATE APPLICATIONS

This invention is based on the research results of a project supported by the US Department of Energy (DOE) SBIR-STTR Program. The US government has certain rights on this invention.

FIELD OF THE INVENTION

The present invention provides a composite composition composed of expanded graphite, a non-expandable component, and a matrix or binder material. The composition can be used to make fuel cell bipolar plates or flow field plates. In particular, the present invention provides a highly conducting, less anisotropic composite flow field plate composition that has an exceptionally high electrical conductivity in the plate thickness direction.

BACKGROUND OF THE INVENTION

A fuel cell converts chemical energy into electrical energy and some thermal energy by means of a chemical reaction between a fuel (e.g., hydrogen gas or a hydrogen-containing fluid) and an oxidant (e.g., oxygen). A proton exchange membrane (PEM) fuel cell uses hydrogen or hydrogen-rich reformed gases as the fuel, a direct-methanol fuel cell (DMFC) uses methanol-water solution as the fuel, and a direct ethanol fuel cell (DEFC) uses ethanol-water solution as the fuel, etc. These types of fuel cells that require utilization of a PEM layer as a proton transport electrolyte are collectively referred to as PEM-type fuel cells.

A PEM-type fuel cell is typically composed of a seven-layered structure, including (a) a central PEM electrolyte layer for proton transport; (b) two electro-catalyst layers on the two opposite primary surfaces of the electrolyte membrane; (c) two fuel or gas diffusion electrodes (GDEs, hereinafter also referred to as diffusers) or backing layers stacked on the corresponding electro-catalyst layers (each GDE comprising porous carbon paper or cloth through which reactants and reaction products diffuse in and out of the cell); and (d) two flow field plates (or a bi-polar plate) stacked on the GDEs. The flow field plates are typically made of graphite, metal, or conducting composite materials, which also serve as electron transport paths. Gas-guiding channels are defined on a GDE facing a flow field plate or, more typically, on a flow field plate surface facing a GDE. Reactants (e.g., $H_2$ or methanol solution) and reaction products (e.g., $CO_2$ at the anode of a DMFC, and water at the cathode side) are guided to flow into or out of the cell through the flow field plates. The configuration mentioned above forms a basic fuel cell unit. Conventionally, a fuel cell stack comprises a number of basic fuel cell units that are electrically connected in series to provide a desired output voltage. If desired, cooling channels and humidifying plates may be added to assist in the operation of a fuel cell stack.

In one common practice, a fuel flow field plate and an oxidant gas flow field plate are separately made and then assembled together to form a bipolar plate (one side of a bipolar plate serving as a negative terminal and the other side as a positive terminal, hence the name). In some cases, an additional separator is sandwiched between the two flow field plates to form a bipolar plate. It would be highly advantageous if the flow filed plates and the separator can be mass-produced into an integrated bipolar plate assembly. This could significantly reduce the overall fuel cell production costs and reduce contact ohmic losses across constituent plate interfaces. The bipolar plate is known to significantly impact the performance, durability, and cost of a fuel cell system. The bipolar plate, which is typically machined from graphite, is one of the most costly components in a PEM fuel cell.

Fluid flow field plates or bipolar plates have open-faced channels formed in one or both opposing major surfaces for distributing reactants to the gas diffuser plates, which are the anode and cathode backing layers, typically made of carbon paper or fabric. The open-faced channels also provide passages for the removal of reaction products and depleted reactant streams. Optionally, a bipolar plate may have coolant channels to manage the fuel cell temperature. According to the US Department of Energy (DOE), a bipolar plate should have the following desirable characteristics: high electrical conductivity (e.g., preferably having a conductivity no less than 100 S/cm and specific areal conductivity no less than 200 $S/cm^2$), low permeability to fuel (e.g., hydrogen) or oxidant fluids (e.g., air or oxygen), good corrosion resistance, and good structural integrity. The specific areal conductivity is essentially the bipolar plate thickness-direction conductivity divided by the plate thickness. Hence, it is highly desirable to have a thinner plate. Current graphite bipolar plates, typically 3-5 mm thick, should preferably be reduced to below 1 mm and most preferably below 0.5 mm.

Conventional methods of fabricating fluid flow field plates require the engraving or milling of flow channels into the surface of rigid plates formed of a metal, graphite, or carbon-resin composite. Such plates are expensive due to high machining costs. The machining of channels into the graphite plate surfaces causes significant tool wear and requires significant processing times. Metals can be readily shaped into very thin plates, but long-term corrosion is a major concern. A corrosion-resistant coating may be used, but it has to be applied perfectly. The coating may also increase contact resistance.

Alternatively, fluid flow field plates can be made by a lamination process (e.g., U.S. Pat. No. 5,300,370, issued Apr. 5, 1994), wherein an electrically conductive, fluid impermeable separator layer and an electrically conductive stencil layer are consolidated to form one open-faced channel. Presumably, two conductive stencil layers and one separator layer may be laminated to form a bipolar plate. It is often difficult and time-consuming to properly position and align the separator and stencil layers. Die-cutting of stencil layers require a minimum layer thickness, which limits the extent to which fuel cell stack thickness can be reduced. Such laminated fluid flow field assemblies tend to have higher manufacturing costs than integrated plates, due to the number of manufacturing steps associated with forming and consolidating the separate layers. Corrosion also presents a challenging issue for metal stencil- or separator-based bipolar plates in a PEM fuel cell since they are used in an acidic environment.

A variety of composite bipolar plates have been developed, which are mostly made by compression molding of polymer matrices (thermoplastic or thermoset resins) filled with conductive particles such as graphite powders or fibers. Because most polymers have extremely low electronic conductivity, excessive conductive fillers have to be incorporated, resulting in an extremely high viscosity of the filled polymer melt or liquid resin and, hence, making it very difficult to process. Bi-polar plates for use in PEM fuel cells constructed of graphite powder/fiber filled resin composite materials and having gas flow channels are reviewed by Wilson, et al (U.S. Pat. No. 6,248,467, Jun. 19, 2001). Injection-molded composite-based bipolar plates are disclosed by Saito, et al. (U.S. Pat.

No. 6,881,512, Apr. 19, 2005 and U.S. Pat. No. 6,939,638, Sep. 6, 2005). These thermoplastic or thermoset composites exhibit a bulk conductivity significantly lower than 100 S/cm (the US Department of Energy target value), typically not much higher than 10 S/cm.

Besmann, et al. disclosed a carbon/carbon composite-based bipolar plate (U.S. Pat. No. 6,171,720 (Jan. 9, 2001) and No. 6,037,073 (Mar. 14, 2000)). The manufacture process consists of multiple steps, including production of a carbon fiber/phenolic resin preform via slurry molding, followed by a compression-molding step. The molded part is then pyrolyzed at a high temperature (1,500° C.-2,500° C.) to obtain a highly porous carbon/carbon composite. This is followed by chemical vapor infiltration (CVI) of a carbon matrix into this porous structure. It is well-known that CVI is a very time-consuming and energy-intensive process and the resulting carbon/carbon composite, although exhibiting a high electrical conductivity, is very expensive.

Instead of using pyrolyzation and CVI to produce carbon/carbon composites, Huang, et al. (US Patent Application Pub. No. 2004/0229993, Nov. 18, 2004) discloses a process to produce a thermoplastic composite with a high graphite loading. First, polymer fibers, such as thermotropic liquid crystalline polymers or polyester, reinforcing fibers such as glass fibers, and graphite particles are combined with water to form a slurry. The slurry is pumped and deposited onto a sieve screen. The sieve screen serves the function of separating the water from the mixture of polymer fibers, glass fibers and graphite. The mixture forms a wet-lay sheet which is placed in an oven. Upon heating to a temperature sufficient to melt the polymer fibers, the wet-lay sheet is allowed to cool and have the polymer material solidify. Upon solidification, the wet-lay sheet takes the form of a sheet material with reinforcement glass fibers held together by globules of thermoplastic material, and graphite particles adhered to the sheet material by the thermoplastic material. Several of these sheets are then stacked, preferably with additional graphite powder interspersed between sheets, and compression-molded in a hot press. After application of heat and pressure in the press, one or more formed bipolar plates are obtained, where the bipolar plates are a composite of glass fibers, thermoplastic matrix and graphite particles. Clearly, this is also a tedious process which is not amenable to mass production.

Alternatively, fluid flow field plates can be made from an electrically conductive material that is sufficiently compressible or moldable so as to permit embossing. Flexible graphite sheet is generally suitable for this purpose because it is compressible and embossing processes may be used to form channels in one or both major surfaces of a sheet. The "flexible graphite" is typically obtained by first treating natural graphite particles with an agent that intercalates into the crystal structure of the graphite to form a graphite intercalated compound (GIC). The GIC is then exposed to a thermal shock up to a temperature of typically 800-1,100° C.) to expand the intercalated particles by typically 80-300 times in the direction perpendicular to the carbon layers in the crystal structure. The resulting expanded or exfoliated graphite particles are vermiform in appearance, and are therefore commonly referred to as worms. Hereinafter, the term "exfoliated graphite" will be used interchangeably with the term "expanded graphite." The worms may be re-compressed together into flexible sheets which can be formed and cut into various shapes. These thin sheets (foils or films) are commonly referred to as flexible graphite. Flexible graphite can be wound up on a drum to form a roll of thin film, just like a roll of thin plastic film or paper.

Although a flexible graphite sheet is highly conductive in the directions parallel to the two opposed surfaces of a sheet (in-plane conductivity typically in the range of 1,100-1,750 S/cm), the thickness-direction is typically rather poor (typically 3-15 S/cm). Furthermore, flexible graphite sheets by themselves do not have sufficient stiffness and must be supported by a core layer or impregnated with a resin. For example, U.S. Pat. No. 5,527,363 (Jun. 18, 1996) discloses a fluid flow field plate comprising a metal sheet interposed between two flexible graphite (FG) sheets having flow channels embossed on a major surface thereof. These FG-metal-FG laminates are subject to the delamination or blistering problem, which could weaken the plate and may make it more fluid permeable. Delamination or blistering can also cause surface defects that may affect the flow channels on the plate. These problems may be difficult to detect during fabrication and may only emerge at a later date. The vastly different coefficients of thermal expansion (CTE) and elastic constants between a metal and a flexible graphite layer result in many challenging problems. In particular, thermal cycling between frozen and thawed states, as are likely to be encountered in an automobile application of the fuel cell, could result in delamination between a flexible graphite sheet and the metal layer if they are not adequately bonded together.

Flexible graphite (FG) sheets adequately bonded by a nanocomposite layer were disclosed in two of our earlier patent applications: (1) Bor Z. Jang, "Sheet Molding Compound Flow Field Plate, Bipolar Plate and Fuel Cell," U.S. patent Ser. No. 11/293,540 (Dec. 5, 2005) and (2) Bor Z. Jang, A. Zhamu, and Lulu Song, "Method for Producing Highly Conductive Sheet Molding Compound, Fuel cell Flow Field Plate, and Bipolar Plate," U.S. patent Ser. No. 11/293,541 (Dec. 5, 2005). These earlier applications were related to a composition that has three layers: a top conductive FG sheet, a middle conductive filler-resin mixture layer, and a bottom conductive FG sheet. This three-layer structure, after embossing or molding, becomes a flexible graphite-based sheet molding compound (FG-SMC).

Alternatively, Mercuri, et al. (e.g., U.S. Pat. No. 5,885,728, Mar. 23, 1999 and U.S. Pat. No. 6,037,074, Mar. 14, 2000) disclosed a flexible graphite sheet having embedded ceramic or glass fibers extending from its surface into the sheet to increase the resin permeability of the sheet for the preparation of a resin-impregnated flexible graphite bipolar plate. By allowing ceramic or glass fibers to puncture through layers of exfoliated graphite one also leaves these layers vulnerable to gas permeation, thereby significantly reducing the hydrogen and oxygen permeation resistance of a bipolar plate and increasing the chance of dangerous mixing of hydrogen and oxygen inside a fuel cell stack.

What follows is a summary of the state of the art of the resin-impregnated expanded graphite composite, resin-impregnated flexible graphite sheet composite, and methods of producing these composites: (It may be noted that these composites were not developed with fuel cell bipolar plates in mind (except for those by Mercuri, et al). The gas permeation resistance of these composites was not considered. These composites were not multi-functional laminates comprising at least two layers with at least one layer providing permeation resistance and at least another layer providing corrosion resistance or bonding strength to prevent delamination).

Olstowski, et al. ("Novel Compressed Cohered Graphite Structures and Method of Preparing Same," U.S. Pat. No. 3,492,197, Jan. 27, 1970) provided compressed and resin-bonded forms of expanded vermicular graphite. The resin-bonded composite is obtained by (a) providing a supply of an expanded vermicular graphite having an apparent bulk density of 0.2-2.0 pounds per cubic foot; (b) providing a supply of a bonding agent; (c) blending the expanded vermicular graphite and bonding agent in an amount of 2-35 weight percent bonding agent based on the total weight of the expanded graphite-bonding agent mixture; (d) compressing the mixture at a pressure of 5-50,000 psi in predetermined directions into predetermined forms of cohered graphite; and (e) treating the so-formed composite to activate the bonding agent thereby promoting adhesion within the compact. This invention taught about compressing vermicular-bonding agent mixture in a uniaxial direction to produce a highly anisotropic composite and in bi-axial, tri-axial, cylinder-radial, and isostatic directions to produce less anisotropic or more isotropic composites. However, it failed to teach, implicitly or explicitly, how a desired degree of isotropy could be maintained when the bi-axially, tri-axially, cylinder-radially, and isostatically compressed composite compacts (prior to curing or fusing to consolidate) were re-compressed or molded as a final operation to become a thin composite plate. This thin plate (thinner than 5 mm, preferably thinner than 3 mm, further preferably thinner than 1 mm, and most preferably thinner than 0.5 mm) is for a bipolar plate application. Further, this patent was limited to using a solid bonding agent to begin with the blending process, excluding liquid polymers from the invention due to the perceived notion that these liquid polymers "can prevent formation of highly densified composites." This patent did not teach how bi-axial, tri-axial, cylinder-radial, and isostatic compressions could be accomplished in a real manufacturing environment for the mass production of less anisotropic composites. Furthermore, the method disclosed in this patent entailed first exfoliating graphite to obtain graphite worms and then mixing graphite worms with a bonding agent in a fine solid powder form. Once the graphite worms are formed, it would be very difficult to mix the worms with fine solid particles in a homogeneous manner without breaking up or significantly disturbing the continuous network of electron-transport paths (interconnected graphite flakes).

Caines ("Vermicular Expanded Graphite Composite Materials," U.S. Pat. No. 4,265,952, May 5, 1981) disclosed an expanded graphite composite containing a corrosion resistant resin (e.g., polytetrafluoroethylene, PTFE). The composite was prepared by blending vermicular graphite with a suspension of fine solid resin particles in a carrier liquid medium, vaporizing the carrier, and heating the composite material to sinter the resin. No electrical property of the resulting composite was reported.

Atkinson, et al. ("Housing for Electrical or Electronic Equipment," U.S. Pat. No. 4,530,949, Jul. 23, 1985) provided a low-density composite composition consisting of exfoliated graphite and a thermosetting resin binder. The density (<0.1 gm/cm$^3$) and the electrical conductivity (0.1 S/cm) values are relatively low.

Fukuda, et al. ("Reinforced Flexible Graphite Sheet," U.S. Pat. No. 4,729,910, Mar. 8, 1988) disclosed a process of producing thermosetting resin reinforced flexible graphite sheets. The process involved subjecting both the flexible graphite sheet and a phenolic resin solution to a preliminary de-aeration treatment prior to immersing the flexible graphite sheet in the resin solution. No electrical conductivity data was offered.

Chung provided a low-density (0.7 gm/cm$^3$) exfoliated flexible graphite flake-reinforced composite with a conductivity of 2 S/cm (Chung, "Low-Density Graphite-Polymer Electrical Conductor," U.S. Pat. No. 4,704,231, Nov. 3, 1987). Chung also provided an in-situ exfoliation method of producing graphite flake-reinforced epoxy composites ("Composites of 1n-Situ Exfoliated Graphite," U.S. Pat. No. 4,946,892, Aug. 7, 1990).

Fong, et al. ("Methacrylate Impregnated Carbonaceous Parts," U.S. patent application Ser. No. 09/896,178, filed on Jun. 29, 2001 (Pub. No. US 2001/0046560, Pub date Nov. 29, 2001)) disclosed a method of impregnating a highly porous carbon material with a methacrylate polymer. No electrical conductivity data was provided.

Öttinger, et al. ("Impregnated Bodies Made of Expanded Graphite, Process for Producing Such Bodies and Sealing Elements, Fuel Cell Components and Heat-Conducting Elements Formed of the Bodies," U.S. Pat. No. 6,746,771, Jun. 8, 2004) provided composites of expanded graphite impregnated with isocyanate or epoxy resins. The method involved soaking expanded graphite with a low-viscosity, polymerizing resin. The achievable electrical conductivity of the resulting composites appears to be in the range of 2-10 S/cm.

Da Silva, et al. ("Method for Producing Composite Objects Using Expanded Graphite and Vermiculite," U.S. patent application Ser. No. 10/574,803 filed on Oct. 8, 2004 (Pub. No. US 2007/0015267, Pub date Jan. 18, 2007)) disclosed a method of producing s composite object consisting of at least two distinct parts.

Mercuri, et al. ("Flexible Graphite Article and Method of Manufacture," U.S. Pat. No. 6,432,336, Aug. 13, 2002 and No. 6,706,400, Mar. 16, 2004) disclosed a resin-impregnated flexible graphite sheet exhibiting enhanced isotropy and a method of producing resin-impregnated flexible graphite sheet. The method includes the steps of (i) reacting raw natural graphite flake-like particles with a liquid intercalant solution to form intercalated graphite particles; (ii) exposing the intercalated graphite particles to a temperature of at least about 700° C. to expand the intercalated graphite particles to form a stream of exfoliated graphite particles; (iii) continuously compressing the stream of exfoliated graphite particles into a continuous coherent self-supporting mat of flexible graphite; (iv) continuously contacting the flexible graphite mat with liquid resin and impregnating the mat with liquid resin; and (v) continuously calendering the flexible graphite mat to increase the density thereof to form a continuous flexible graphite sheet having a thickness of no more than about 1.0 inch.

It is of interest to note that this process disclosed by Mercuri, et al. involves compressing the exfoliated graphite into a flat mat prior to impregnating the mat with a resin. This sequence is disadvantageous in that the re-compressed flexible graphite, being much denser, is less permeable to resin impregnation. Furthermore, uniaxial re-compression of the exfoliated graphite prior to resin impregnation tends to align or orientate the graphite flakes along the graphite sheet plane direction (perpendicular to the re-compression vector), resulting in a more anisotropic flexible graphite sheet composite. Once these flakes were well-aligned in a sheet to form a highly cohered mat, their orientations could no longer be changed during subsequent resin impregnation and molding operations. Furthermore, no attempt was made to re-compress the mat in different directions. Thin graphite flakes are essentially single crystals with the flake plane parallel to the basal plane and, hence, exhibit a high electrical conductivity along thin flake plane directions and much lower conductivity along the thickness direction, or c-axis direction. Consequently, the bipolar plates prepared by using the Mercuri process are not expected to have a high thickness-direction conductivity.

The resin-impregnated flexible graphite sheet exhibiting enhanced isotropy as disclosed by Mercuri, et al. (U.S. Pat.

No. 6,706,400) was said to contain interlocked particles of expanded graphite. A portion of these interlocked particles of expanded graphite was substantially unaligned with the opposed planar surfaces. However, Mercuri, et al. did not fairly specify how these unaligned graphite flakes were obtained. Presumably, this could be achieved by mixing large particles of exfoliated graphite with smaller particles of exfoliated graphite, as implied in a Mercuri's earlier patent (U.S. Pat. No. 5,846,459, Dec. 8, 1998). The trade literature published by GrafTech (assignee of Mercuri's patents) indicates the electrical resistivity of bipolar plates in the X-Y plane as 7 μOhm-m (in-plane conductivity=1428 S/cm) and in the Z-direction as 300 μOhm-m (i.e., thickness-direction conductivity=33 S/cm). The thickness-direction conductivity is unsatisfactory.

In addition to exhibiting high electrical conductivity, good resistance to gas permeation, and corrosion resistance, the flow field plate or bipolar plate should be constructed from inexpensive starting materials, materials that are easily formed into any plate configuration, preferably using a continuous molding process, and materials that do not require further processing such as high temperature pyrolyzation treatments. The above review clearly indicates that prior art bipolar plate material compositions and processes have not provided a satisfactory solution for the fuel cell industry.

These issues were addressed in two of our co-pending US patent applications: Aruna Zhamu, Jinjun Shi, Jiusheng Guo, and Bor Z. Jang, "Exfoliated Graphite Composite Compositions for Fuel Cell Flow Field Plates," Ser. No. 11/800,729 (May 8, 2007) and Aruna Zhamu, Jinjun Shi, Jiusheng Guo, and Bor Z. Jang, "Method of Producing Exfoliated Graphite Composite Compositions for Fuel Cell Flow Field Plates," Ser. No. 11/800,730 (May 8, 2007). These two applications provide an electrically conductive, less anisotropic, and structurally sound composite composition for fuel cell flow field plate or bipolar plate applications and methods of producing this composite composition. The composite composition comprises: (a) expanded or exfoliated graphite; (b) particles of non-expandable graphite or carbon, wherein these particles are between 3% and 60% by weight based on the total weight of the particles and the expanded graphite; and (c) a binder or matrix material to bond the expanded graphite and the particles of non-expanded graphite or carbon for forming a highly conductive composite, wherein the binder or matrix material is between 3% and 60% by weight based on the total composite composition weight. The composite plate exhibits a thickness-direction conductivity typically greater than 35 S/cm, more typically greater than 50 S/cm, most typically greater than 100 S/cm, and a thickness-direction specific areal conductivity greater than 200 S/cm$^2$, more typically greater than 500-1,500 S/cm$^2$. These two applications did not address the issue of hydrogen gas permeation resistance of the resulting composite. In a preferred embodiment of the instant application, a thin metal layer is sandwich between two exfoliated graphite composite sheets to form a three-layer laminate. The top and bottom composite sheets are of identical or similar compositions to those disclosed in these two previous applications, but a core metal sheet is incorporated for the primary purpose of imparting exceptional hydrogen permeation resistance.

Accordingly, an object of the present invention is to provide a multi-layer laminate composition comprising at least an exfoliated graphite composite sheet and a thin metal sheet wherein both the composite sheet and the metal sheet exhibit a relatively high thickness-direction conductivity and wherein the laminate has a high resistance to gas permeation.

Another object of the present invention is to provide a laminate composition that can be easily molded or embossed into a flow field plate or bipolar plate having surface flow field channels and other desired geometric features.

Still another object of the present invention is to provide a laminate that comprises two highly conducting exfoliated graphite composite sheets sandwiching a metal sheet or foil.

Yet another object of the present invention is to provide a process for producing a laminate comprising exfoliated graphite composite sheets. Such a process can be continuous, automated, and adaptable for mass production of bipolar plates.

SUMMARY OF THE INVENTION

This invention provides an electrically conductive laminate composition for fuel cell flow field plate or bipolar plate applications. The laminate composition comprises at least a thin metal sheet having two opposed exterior surfaces and a first exfoliated graphite composite sheet bonded to the first of the two exterior surfaces of the metal sheet wherein the exfoliated graphite composite sheet comprises: (a) expanded or exfoliated graphite and (b) a binder or matrix material to bond the expanded graphite for forming a cohered sheet, wherein the binder or matrix material is between 3% and 60% by weight based on the total weight of the first exfoliated graphite composite sheet.

Preferably, the first exfoliated graphite composite sheet further comprises particles of non-expandable graphite or carbon in the amount of between 3% and 60% by weight based on the total weight of the non-expandable particles and said expanded graphite. Further preferably, the laminate comprises a second exfoliated graphite composite sheet bonded to the second surface of the metal sheet to form a three-layer laminate. Surface flow channels and other desired geometric features can be built onto the exterior surfaces of the laminate to form a flow field plate or bipolar plate using embossing or matched-die molding.

Either one or both of the exfoliated graphite composite sheets preferably comprises: (a) expanded or exfoliated graphite; (b) particles of non-expandable graphite or carbon, wherein these particles are between 3% and 60% by weight based on the total weight of the particles and the expanded graphite; and (c) a binder or matrix material to bond the expanded graphite and the particles of non-expanded graphite or carbon for forming a highly conductive composite, wherein the binder or matrix material is between 3% and 60% by weight based on the total composite sheet weight. The composite sheet typically exhibits a thickness-direction conductivity typically greater than 35 S/cm, more typically greater than 50 S/cm, most typically greater than 100 S/cm, and a thickness-direction specific areal conductivity greater than 200 S/cm$^2$, more typically greater than 500-1,500 S/cm$^2$. The core metal sheet imparts to the laminate not only ultra-high electrical conductivity but also excellent hydrogen permeation resistance, and essentially prevents dangerous mixing between the oxygen stream and the hydrogen stream in a fuel cell. The hydrogen permeation rate is practically zero.

It may be noted that the US Department of Energy (DOE) target for composite bipolar plates includes a hydrogen gas permeation flux of $<2 \times 10^{-6}$ cm$^3$/(cm$^2$-s) and a bulk electrical conductivity of greater than 100 S/cm or an areal conductivity of greater than 200 S/cm$^2$, where the areal conductivity is essentially the ratio of the thickness-direction conductivity to the plate thickness. This implies that a thinner plate has a higher areal conductivity, given the same thickness-direction conductivity. One of the advantages of the presently invented composite composition is the notion that this composition can be prepared in such a manner that the resulting composite plate can be as thin as 0.6 mm or thinner, in sharp contrast to the conventional graphite bipolar plates which typically have a thickness of 3-5 mm. This, when coupled with the fact that bipolar plates typically occupy nearly 90% of the total fuel cell stack thickness, implies that our technology enables the fuel cell stack size to be reduced dramatically. The resulting plates have electrical conductivities far exceeding the DOE target values, which was an original objective of the DOE-sponsored research and development work that resulted in the present invention.

BRIEF DESCRIPTION OF THE DRAWING

FIG. 2 Schematic of a three-layer model for estimating the thickness-direction conductivity of a laminate.

DETAILED DESCRIPTION OF THE INVENTION

Figure 1A:
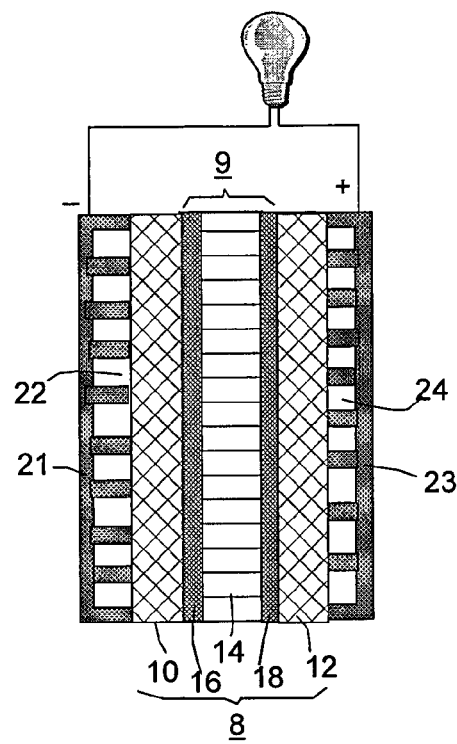
FIG. 1: (A) A sectional view of a prior art PEM fuel cell consisting of a membrane electrode assembly (MEA) sandwiched between two flow field plates 21, 23; and (B) A sectional view of a fuel cell stack consisting of two fuel cell units connected in series through a bipolar plate 19.

A prior art fuel cell, as shown in FIG. 1(A), typically comprises a membrane electrode assembly 8, which comprises a proton exchange membrane 14 (PEM), an anode backing layer 10 connected to one face of the PEM 14, and a cathode backing layer 12 connected to the opposite face of PEM 14. Anode backing layer 10 is also referred to as a fluid diffusion layer or diffuser, typically made of carbon paper or carbon cloth. A platinum/ruthenium electro-catalytic film 16 is positioned at the interface between the anode backing layer and PEM 14 for promoting oxidation of the methanol fuel. Similarly, at the cathode side, there are a backing layer or diffuser 12 (e.g., carbon paper or carbon cloth) and a platinum electro-catalytic film 18 positioned at the interface between the cathode backing layer and PEM 14 for promoting reduction of the oxidant.

In practice, the proton exchange membrane in a PEM-based fuel cell is typically coated on both sides with a catalyst (e.g., Pt/Ru or Pt) to form a catalyst-coated membrane 9 (CCM). The CCM layer 9 is then sandwiched between an anode backing layer 10 (diffuser) and a cathode backing layer 12 (diffuser). The resulting five-layer assembly is called a membrane electrode assembly 8 (MEA). Although some fuel cell workers sometimes refer to CCM as a MEA, we prefer to take the MEA to mean a five-layer configuration: anode backing layer, anode catalyst layer, PEM, cathode catalyst layer, and cathode backing layer.

The fuel cell also comprises a pair of fluid distribution plates (also referred to as fluid flow field plates) 21 and 23, which are positioned on opposite sides of membrane electrode assembly 8. Plate 21, which serves as a fuel distribution plate, is shaped to define fuel flow channels 22 facing towards anode diffuser 10. Channels 22 are designed to uniformly deliver the fuel to the diffuser, which transports the fuel to the anode catalyst layer 16. An input port and an output port (not shown), being in fluid communication with channels 22, may also be provided in flow field plate 21 so that carbon dioxide (in a DMFC) can be withdrawn from channels 22.

Figure 1B:
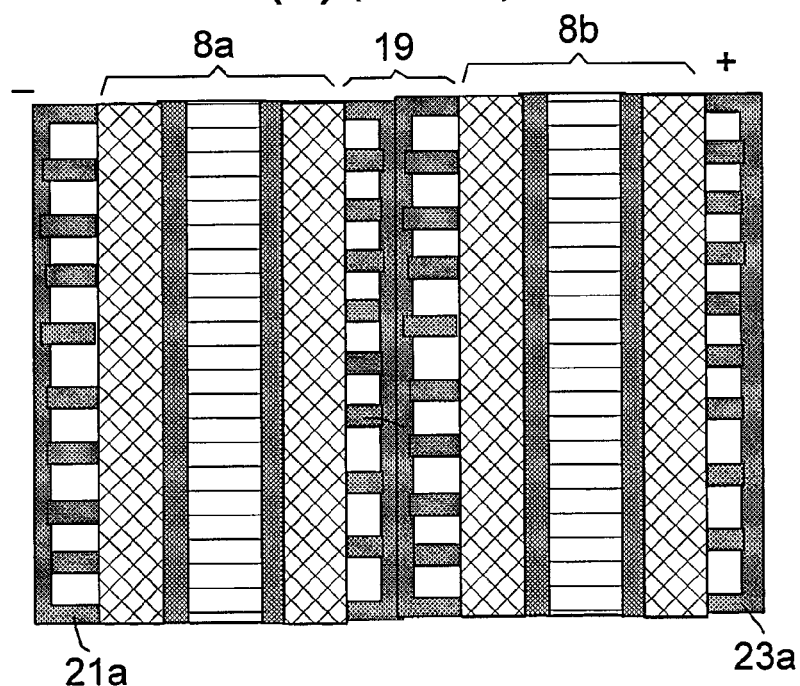

Flow field plate 23 is shaped to include fluid channels 24 for passage of a quantity of gaseous oxygen (or air). An input port and an output port (not shown) are provided in plate 23, which are in fluid communication with channels 24 so that oxygen (or air) can be transported through the input port to the cathode diffuser 12 and cathode catalyst layer 18, and water and excess oxygen (or air) can be withdrawn from channels 24 through the output port. Plate 23 is electrically conductive and in electrical contact with cathode diffuser 12. It can be used as a uni-polar plate (the positive terminal of the electrical current generated by the fuel cell unit) or as a part of a bi-polar plate (if integrated with fuel flow field plate 21). Shown in FIG. 1(B) is a fuel cell stack that consists of two fuel cell units. On the two opposite sides of the stack are two separate flow field plates 21a, 23a. Between the two MEAs (8a and 8b) is a bipolar plate 19, which can be viewed as two flow field plates integrated into one single component.

As indicated earlier, bipolar plates can be made from an electrically conductive flexible graphite sheet, which is then impregnated with a resin (e.g., Mercuri, et al., U.S. Pat. No. 6,432,336, Aug. 13, 2002 and No. 6,706,400, Mar. 16, 2004). Flexible graphite sheets are compressible and embossing processes may be used to form channels in one or both major surfaces of a sheet. Conventionally, flexible graphite is obtained first by intercalating graphite with an intercalating agent (also referred to as an intercalate or intercalant) to form a graphite intercalation compound (GIC). Then, the GIC is exposed to a thermal shock at a temperature of 1700-1,050° C. for a short duration of time (20-60 seconds) to expand or exfoliate graphite. The exfoliation is characterized by an expansion of graphite particles up to a ratio of typically 80-300 times in the c-axis direction, perpendicular to the graphene or basal plane of the graphite crystal structure. The exfoliated graphite particles are vermiform in appearance and are therefore commonly referred to as worms. The worms may be re-compressed together into flexible sheets which are characterized by having most of the graphite flakes oriented parallel to the two opposed exterior surfaces, which are largely perpendicular to the c-axis. These thin sheets (foils or films) are referred to as flexible graphite. Flexible graphite (FG) can be wound up on a drum to form a roll of thin film, just like a roll of thin plastic film or paper. Although a conventional flexible graphite sheet is typically highly conductive along the sheet plane directions, their thickness-direction conductivity is rather poor (reported to be approximately 15 S/cm). With this relatively low thickness-direction conductivity, the resulting FG-metal-FG laminate (wherein FG is plain graphite sheet without resin impregnation, as proposed in U.S. Pat. No. 5,527,363, Jun. 18, 1996) will also have a relatively low thickness-direction conductivity. This may be understood as follows:

Shown in FIG. 2 is a simplified model of a three-layer laminate plate consisting of top, core, and bottom layers that are electrically connected in series. The total resistance ($R_S = R_1 + R_2 + R_3$), equivalent resistivity ($\rho_S = (2\rho_1 t_1 + \rho_2 t_2)/(2t_1 + t_2)$), conductivity ($\sigma_S = 1/\rho_S$), and areal conductivity ($\Sigma=1/(A_S R_S)=\sigma_S/(2t_1+t_2)$) of the three-layer plate can be easily estimated. Assume that both the top and bottom layers are FG sheets with a thickness-direction conductivity of 15 S/cm (the best available value of commercially available FG sheets) and thickness of 0.3 mm each and that the core metal sheet is a copper foil with a conductivity of 100,000 S/cm and thickness of 0.3 mm. Then, the overall conductivity of the laminate is 22.4 S/cm, which does not meet the DOE requirement. The above equations indicate that a low-conductivity layer of a multi-layer structure tends to dominate the overall conductivity of the structure. In this case, the top and bottom layer conductivity values in the thickness direction are relatively low and, hence, the conductivity of the resulting laminate is low despite the fact that copper sheet is so highly conductive. Now, assume that the top and bottom layers have a thickness-direction conductivity of 79-255 S/cm, as obtained by the presently invented exfoliated graphite-epoxy composite sheets (to be presented in an example later). Then, the thickness-direction conductivity of the same laminate will be 118-384 S/cm. These are very impressive values not achievable with prior art resin composites or laminates. It may be noted that, although Mercuri, et al., (U.S. Pat. No. 6,432,336, Aug. 13, 2002 and No. 6,706,400, Mar. 16, 2004) proposed the application of resin-impregnated FG sheets in making bipolar plates, they did not implicitly or explicitly propose a multi-layer structure, nor did they recognize the significance of incorporating these composite sheets and a core metal layer to form a three-layer bipolar plate.

Hence, with the above considerations in mind and after extensive research and development work, we have developed a multi-layer laminate (having at least two layers, but preferably three layers) that is highly conductive, corrosion resistant, and resistant to gas permeation. In fact, the laminate is practically impermeable to hydrogen and oxygen. The laminate comprises at least a first exfoliated graphite composite layer bonded to a thin metal layer to form a two-layer structure. The metal sheet is preferably further bonded to a second exfoliated graphite composite layer to form a three-layer structure. The composite layer is based on exfoliated graphite (but generally not based on conventional flexible graphite sheets) which is impregnated with a binder or matrix material, preferably a thermoset resin. The resulting two-layer or three-layer laminate (or more layers) can be easily molded into a flow field plate or bipolar plate. The composite sheets exhibit a thickness-direction conductivity typically greater than 35 S/cm, more typically greater than 50 S/cm, often greater than 100 S/cm, and in many cases, greater than 200 S/cm (typically between 79 and 255 S/cm for our epoxy-exfoliated graphite composite sheets). These impressive conductivity values hitherto have not been known to be achievable with prior art resin-impregnated flexible graphite sheet composites.

The invented composite sheet preferably comprises: (a) expanded or exfoliated graphite (including, for instance, expanded graphite, expanded graphite oxide, and expanded graphite fluoride containing less than 20% of non-carbon elements); (b) particles of non-expandable graphite or carbon (e.g., natural graphite particles and carbon black serving as an isotropy-promoting agent, which is optional but highly desirable), wherein the amount of the non-expandable graphite or carbon is between 3% and 60% by weight based on the total weight of the particles and the expanded graphite together; and (c) a binder or matrix material to bond the expanded graphite and the particles of non-expanded graphite or carbon for forming a highly conductive composite, wherein the binder or matrix material amount is between 3% and 60% by weight based on the total composite composition weight. It may be noted that the exfoliated graphite in the instant invention can be selected from exfoliated natural graphite, synthetical graphite, highly oriented pyrolytic graphite, graphite fiber, graphitic nano-fiber, graphite oxide, graphite fluoride, chemically modified graphite, or a combination thereof. These species form a laminar or layered structure that can be intercalated and exfoliated.

Thin metal sheets are commercially available in various thicknesses. Preferably the metal sheet thickness is lower than 1 mm, further preferably lower than 0.5 mm, and most preferably lower than 0.3 mm. There is no theoretical limitation on the type of metal or alloy that can be used for practicing the present invention. However, those that are highly conductive and can be readily or easily fabricated into flexible thin sheets, foils, or films are preferred; e.g., copper, zinc, steel, nickel, aluminum, etc.

We have surprisingly found that the presence of non-expandable graphite particles (whether larger or smaller than the exfoliated flake sizes) effectively promotes or facilitates more isotropic orientations of exfoliated flakes, resulting in a much higher thickness-direction conductivity of exfoliated graphite plate or resin-impregnated exfoliated graphite plate, typically much greater than 50 S/cm, with 100 S/cm or 200 S/cm readily achievable. This is a highly desirable feature of a bipolar plate since electrons produced by a fuel cell stack flow along this direction. This increase in thickness-direction conductivity is achieved with a slightly reduced in-plane conductivity, which is still very high (500-1,200 S/cm). The slight reduction in the in-plane conductivity is not a concern for fuel cell bipolar plate applications.

The composite sheet composition can further comprise a reinforcement or filler selected from the group consisting of graphite/carbon fiber, graphite/carbon nano-fiber, nano-tube, glass fiber, ceramic fiber, polymer fiber, metal fiber, metal particle, polymer particle, organic particle, inorganic particle, or a combination thereof, wherein the reinforcement or filler is between 0.5% and 30% by weight based on the total weight of expanded graphite, particles of non-expanded graphite or carbon, and reinforcement or filler. In addition to serving as an isotropy-promoting agent, this reinforcement or filler can impart other desired properties to the resulting exfoliated graphite composite. The reinforcement or filler is preferably electrically conductive (e.g., graphite fiber). Although ceramic or glass fibers were incorporated in a prior art resin-impregnated flexible graphite sheet composite, these stiff fibers were used solely or primarily for the purpose of puncturing the exfoliated graphite flakes to enhance resin impregnation (Mercuri, et al., U.S. Pat. No. 5,885,728, Mar. 23, 1999 and U.S. Pat. No. 6,037,074, Mar. 14, 2000). Furthermore, these fibers were not electrically conductive and, hence, could reduce the electrical conductivity of the flexible graphite sheet and its resin-impregnated version. It may be further noted that Mercuri (U.S. Pat. No. 5,846,459, Dec. 8, 1998) did suggest that an amount of exfoliated graphite flakes of smaller dimensions could be mixed with exfoliated graphite flakes of larger sizes to enhance the isotropy of flexible graphite sheets. However, it was not clear if this approach could be adapted to effectively improve the isotropy in the resin-impregnated flexible graphite sheet composite. The best available data published by GrafTech (assignee of Mercuri's patents) indicates a thickness-direction conductivity of 33 S/cm, which is not very impressive. This data seems to suggest that thin flakes of exfoliated graphite are not very effective in enhancing electrical conductivity isotropy of the resulting flexible graphite sheet or resin-impregnated flexible graphite sheet.

In the composite sheet of the presently invented laminate composition, the binder or matrix material may be selected from a polymer, ceramic, glass, metal, carbon, polymeric carbon, asphalt, tar, coal tar pitch, petroleum pitch, mesophase pitch, or a combination thereof. The polymer binder may be preferably selected from the group consisting of polyethylene, polypropylene, nylon, polyesters, polytetrafluoroethylene, polyvinylidene fluoride, fluoro polymers, polyacrylonitrile, acrylic resins, epoxides, polyimide, bismale imide, phenol formaldehydes, vinyl ester, isocyanate resins, and combinations thereof. Many polymers (e.g., phenolic resin and polyacrylonitrile), upon exposure to high temperature (300-1,000° C.), can be converted to polymeric carbons, which are much more conductive than the un-pyrolyzed polymers.

The binder or matrix material may be an inorganic vitreous glass-forming material which contains at least one of the compounds selected from the group consisting of boric oxide, silica, phosphorous pentaoxide, germanium oxides, vanadium pentoxides, and beryllium fluoride. The binder or matrix material may be a glass-forming composition containing at least two oxides selected from the group consisting of silica, aluminum oxide, sodium oxide, potassium oxide, magnesium oxide, cuprous oxide, barium oxide, lead oxide, and boric oxide. These glass-forming materials are less bondable to a metal sheet as compared with a thermoset resin. The binder may be chosen from metals or metal alloys, which are normally very conductive. The metal binder material is preferably the same material as the metal sheet.

Figure 3A:
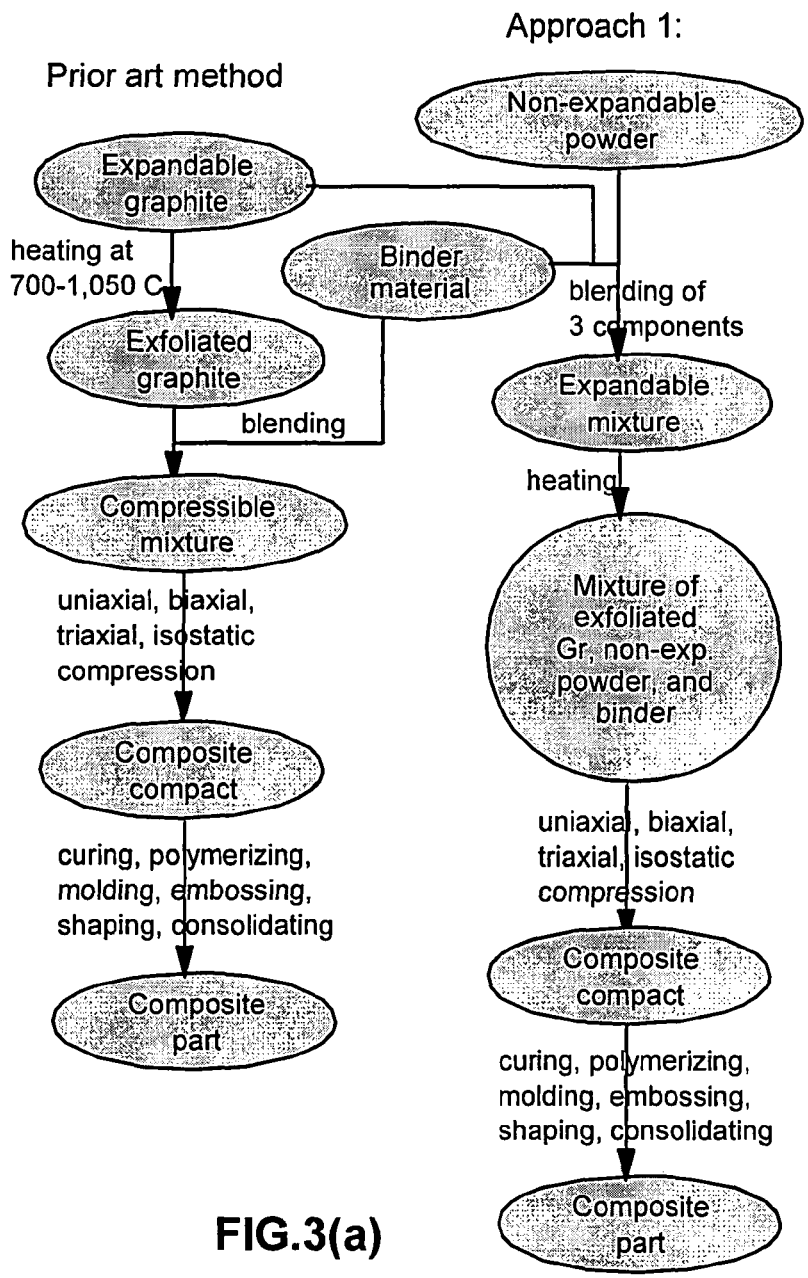
FIG. 3: (a) a flowchart to illustrate a prior art method (left portion) of producing exfoliated graphite composites and one preferred embodiment (right portion) of our previously invented method; (b) a second preferred embodiment of the previously invented method; (c) a third preferred embodiment of the previously invented method. These methods can be adapted for the fabrication of exfoliated graphite composite sheets as constituent layers of the presently invented laminate comprising a metal sheet.

The composite sheet of the presently invented laminate composition and the final bipolar plate can be produced by several unique and effective methods. As one example (Approach 1), schematically shown on the right-hand side of FIG. 3(a), a method of producing an electrically conductive composite includes the following steps: (a) providing a supply of expandable graphite powder; (b) providing a supply of a non-expandable powder component comprising a binder or matrix material (preferably also comprising an isotropy-promoting agent such as non-expandable natural graphite particles); (c) blending the expandable graphite with the non-expandable powder component to form a powder mixture wherein the non-expandable powder component is in the amount of between 3% and 60% by weight based on the total weight of the powder mixture; (d) exposing the powder mixture to a temperature sufficient for exfoliating the expandable graphite to obtain a compressible mixture comprising expanded graphite worms and the non-expandable component; (e) compressing the compressible mixture at a pressure within the range of from about 5 psi to about 50,000 psi in predetermined directions into predetermined forms of cohered graphite composite compact; and (f) treating the so-formed cohered graphite composite to activate the binder or matrix material thereby promoting adhesion within the compact to produce the desired composite.

In this method, step (e) may comprise an uniaxial compression, a biaxial compression, a triaxial compression, and/or an isostatic compression. An uniaxial compression alone tends to produce a more anisotropic composite. A biaxial, triaxial, or isostatic compression produces a composite with reduced anisotropy. As a preferred embodiment of the present invention, the composite preferably is prescribed to go through a biaxial, triaxial, and/or isostatic compression, prior to a final shaping operation, in combination with a metal sheet and another optional but highly desirable composite sheet, to obtain a three-layer bipolar plate. This final shaping operation can involve an uniaxial compression, shearing, impression, embossing, compression molding, or a combination thereof.

This operation results in the formation of a flow field plate or bipolar plate typically with flow field channels built onto at least one surface of the plate. The plate is preferably thin, smaller than 1 mm and more preferably thinner than 0.5 mm. This final operation typically involves a combination of uniaxial compression and some shearing, which could bring the final composite plate back to a less isotropic state (as compared to the composition prior to this final shaping operation). We have surprisingly found that the presence of a non-expandable powder component (e.g., fine particles of natural graphite) serves to eliminate or reduce this further anisotropy induced by the final shaping operation. This is a non-trial and non-obvious discovery, achieved only after extensive, in-depth research and development efforts.

By contrast, a prior art method of producing exfoliated graphite composites (Olstowski, et al. U.S. Pat. No. 3,492, 197), schematically shown on the left-hand side of FIG. 2(a), includes (a) providing a supply of an expanded vermicular graphite having an apparent bulk density of 0.2-2.0 pounds per cubic foot; (b) providing a supply of a bonding agent; (c) blending the expanded vermicular graphite and bonding agent in an amount of 2-35 weight percent bonding agent based on the total weight of the expanded graphite-bonding agent mixture; (d) compressing the mixture at a pressure of 5-50,000 psi in predetermined directions into predetermined forms of cohered graphite; and (e) treating the so-formed composite to activate the bonding agent thereby promoting adhesion within the compact. This prior art method of producing exfoliated graphite composites patently differs from our method (Approach 1 in FIG. 2(a)) in the following ways: (1) Olstowski's method entails the utilization of already-exfoliated vermicular graphite worms and blending the worms with a bonding agent (a binder material). Blending of a fine bonding agent powder with bulky vermicular graphite could be challenging. Presumably the vermicular graphite must have certain pore characteristics, e.g., corresponding to an apparent bulk density of 0.2-2.0 pounds per cubic foot, in order for the bonding agent to properly mix with the exfoliated graphite. By contrast, our Approach 1 involves first mixing expandable graphite (prior to expansion or exfoliation) with a binder material, also in a fine powder form. Since both ingredients are fine solid powders, they can be more uniformly mixed without difficulty. After exfoliation of the expandable graphite, the resulting mixture maintains a good distribution of the binder material (and the non-expandable powder component such as un-intercalated natural graphite particles). Subsequent compression and binder treatments (curing, polymerizing, melting and cooling, etc.) result in a composite of good mechanical integrity.

(2) Olstowski et al. did not use a non-expandable powder component, nor did they recognize the significance of this component in enhancing isotropy of the resulting composite. Although biaxial, triaxial, and isostatic compression were suggested as means of enhancing the isotropy, Olstowski, et al. did not know a non-expandable powder component could further increase the isotropy in samples that have been subjected to compressions in essentially all directions.

(3) The compression operations in predetermined directions were conducted by Olstowski, et al. on relatively thick samples just to prove that compressions in different directions produced varying degrees of anisotropy. They failed to recognize that the formation of a thin bipolar plate from the binder-exfoliated graphite mixture, with or without prior compressions, will have to go through a final shaping operation. This final shaping operation could involve an uniaxial compression and/or some shearing, which could bring the final composite plate back to a less isotropic state. The presence of a non-expandable powder component in our invention serves to eliminate or reduce this problem. The non-expandable powder may have a size larger or smaller than the flake particle size of the exfoliated graphite.

(4) Olstowski, et al. did not consider incorporating a metal sheet to form a laminate for fuel cell bipolar plate applications wherein the metal sheet imparts the resistance of the laminate to permeation by hydrogen and oxygen gases.

The binder or matrix material may be a char-yielding material and the method further comprises a step of baking or pyrolyzing the composite at a temperature for a period of time sufficient to convert the char-yielding material into carbon or graphite. The char-yielding material may be selected from the group consisting of asphalt, tar, sugars, phenolic resins, coal tar pitches, petroleum pitches, mesophase pitches, saccharides, organic polymers, and combinations thereof.

Figure 3B:
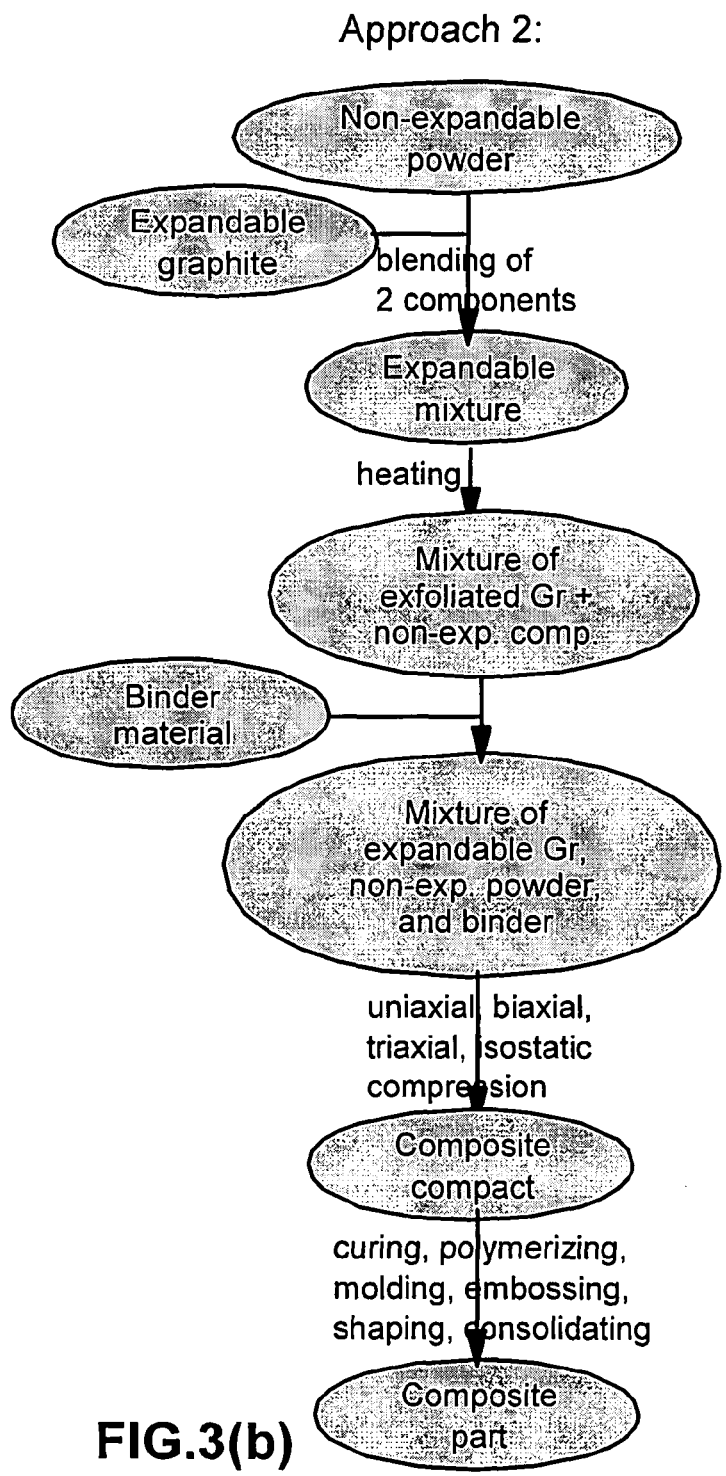

A second method (Approach 2) of producing an electrically conductive composite for use in the laminate composition is schematically shown in FIG. 3(b). This method is similar to Approach 1, but the binder material in Approach 2 is added after exfoliation of expandable graphite. The method comprises: (a) providing a supply of expandable graphite powder; (b) providing a supply of an isotropy-promoting, non-expandable powder component; (c) blending the expandable graphite with the non-expandable powder component to form a powder mixture wherein the non-expandable powder component is between 3% and 60% by weight based on the total weight of the powder mixture; (d) exposing the powder mixture to a temperature sufficient for exfoliating the expandable graphite to obtain a compressible mixture comprising expanded graphite worms and the non-expandable component; (e) impregnating the compressible mixture with a binder or matrix material, wherein the binder or matrix material is between 3% and 60% by weight based on the total weight of the composite composition; (f) compressing the impregnated compressible mixture at a pressure within the range of from about 5 psi to about 50,000 psi in predetermined directions into predetermined forms of cohered graphite composite compact; and (g) treating the so-formed cohered graphite composite to activate the binder or matrix material thereby promoting adhesion within the compact to produce the composite composition.

Again, in this method, step (f) may comprise an uniaxial compression, a biaxial compression, a triaxial compression, and/or an isostatic compression. As a preferred embodiment of the present invention, the composite is subjected to a biaxial, triaxial, and/or isostatic compression, prior to combining with a metal sheet and subjecting to a final shaping operation to obtain a bipolar plate. This shaping operation can involve an uniaxial compression, shearing, impression, embossing, compression molding, or a combination thereof. This final shaping operation results in the formation of a flow field plate or bipolar plate typically with flow field channels built onto at least one surface of the plate. The plate is preferably smaller than 1 mm and more preferably thinner than 0.5 mm. Again, the presence of a non-expandable powder component (e.g., fine particles of natural graphite) serves to eliminate or reduce the further anisotropy induced by the final shaping operation.

Again, the binder or matrix material may be a char-yielding material and the method further comprises a step of baking or pyrolyzing the composite at a temperature for a period of time sufficient to convert the char-yielding material into carbon or graphite. The char-yielding material may be selected from the group consisting of asphalt, tar, sugars, phenolic resins, coal tar pitches, petroleum pitches, mesophase pitches, saccharides, organic polymers, and combinations thereof.

In a preferred embodiment of Approach 2, step (e) comprises impregnating the compressible mixture with a first component of a two-component or multiple-component thermosetting or polymerizing resin and then impregnating the compressible mixture with a second component of the resin. In particular, step (e) may comprise impregnating the compressible mixture with a mixture of a volatile diluent and a first component of a two-component or multiple-component thermosetting or polymerizing resin, removing the volatile diluent, and then impregnating the compressible mixture with a second component of the resin. A diluent is used to reduce the viscosity and surface energy of the curing agent, promoting surface wetting and impregnation of exfoliated graphite with this curing agent. Once the interior and exterior surfaces of the pores in exfoliated graphite are wetted with the curing agent, subsequent impregnation or infiltration of the resin is essentially spontaneous. This is due to the notion that typically a curing agent is chemically compatible with its matting base resin. Preferably, the resin comprises epoxy resin and the first component of a two-component epoxy system comprises a curing agent or hardener.

Figure 3C:
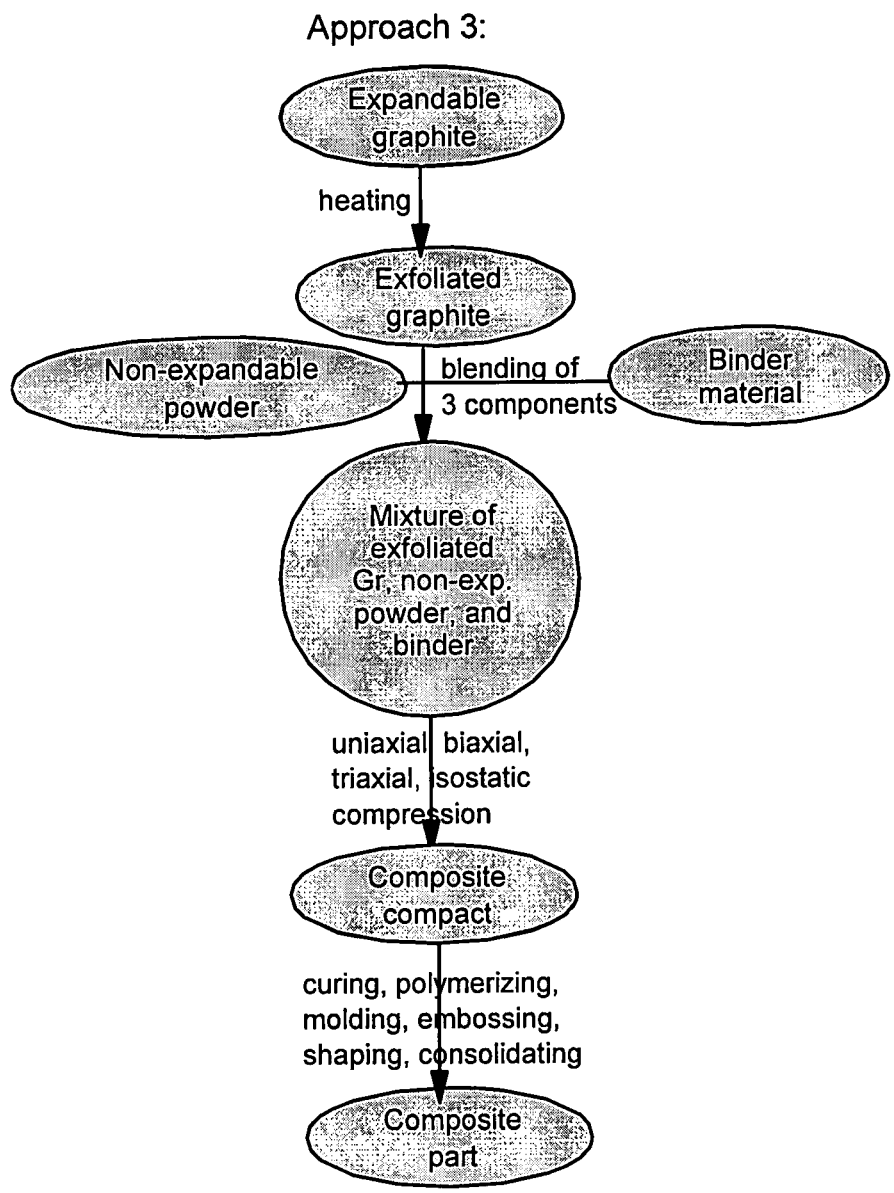

Another method of producing a highly conductive bipolar plate composite is shown in FIG. 3(c) and hereinafter referred to as Approach 3, which is similar to Approach 2. However, in Approach 3, the isotropy-promoting, non-expandable powder component is added after graphite exfoliation. According to a preferred embodiment of Approach 3, the method includes (a) providing a supply of exfoliated graphite; (b) providing a supply of an isotropy-promoting, non-expandable powder component, wherein the non-expandable powder component is between 3% and 60% by weight based on the total weight of the exfoliated graphite and the non-expandable powder component; (c) providing a supply of a binder material, wherein the binder material is between 3% and 60% by weight based on the total weight of the final composite composition; (d) blending the exfoliated graphite, the non-expandable powder component, and the binder material to form a compressible mixture; (e) compressing the compressible mixture at a pressure within the range of from about 5 psi to about 50,000 psi in predetermined directions into predetermined forms of cohered graphite composite compact; and (f) treating the so-formed cohered graphite composite to activate the binder material thereby promoting adhesion within the compact to produce the desired composite composition.

Figure 4:
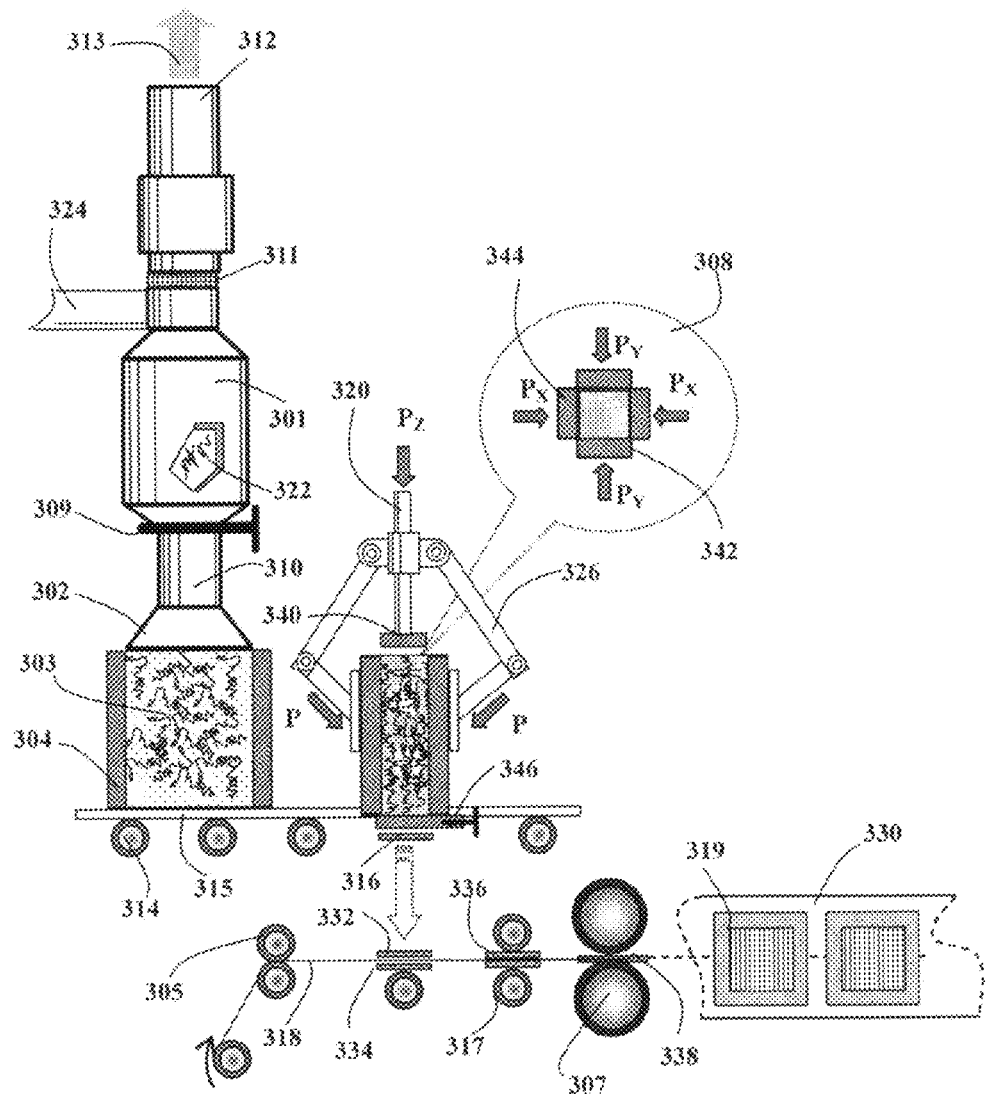
FIG. 4: Schematic of a production system for manufacturing fuel cell bipolar plates from raw materials such as expandable graphite, non-expandable powder, a binder or matrix material, and a metal sheet. The surface flow channels of bipolar plates can be generated via in-line embossing or matched-die molding.

The process for producing exfoliated graphite composite sheets for laminated bipolar plates may be further illustrated by referring to FIG. 4. The mixture 322 of exfoliated graphite, the isotropy-promoting agent (non-expandable graphite, etc.), and the binder material are transported through a conduit 324 via compressed air into a chamber 301. Exhaust air 313 permeates through a filter 311 and a pipe 312 into the outside atmosphere. The mixture 322 may be allowed to drop, on demand, through a control valve 309, a conduit 310, and a funnel or hopper 302 into a chamber of a compression device 304. The mixture 303 in this compression chamber is moved forward on a conveyor belt 315 driven by motorized rollers (e.g., 314). The mixture may be uniaxially compressed (e.g., along the X-axis direction, defined to be the first compression vector which is parallel to the conveyor belt movement direction in the present case). It may be biaxially compressed in both the X- and Y-axis directions by a mechanism denoted by 326, which drives a pair of moveable members 344 in the X-direction $P_x$ and another pair of moveable members 342 in the Y-direction $P_y$. The insert 308 of FIG. 4 shows the top view of a biaxial compression operation along X- and Y-directions. The mixture may then be compressed in the Z-direction $P_x$ using a pushing rod 320 with a piston head 340. Individual pieces (e.g., 316) may be dropped downward from an opening by a valve 346.

In the meantime, a metal sheet or foil 318 may be fed from feeder rollers (e.g., 315) to move forward (toward the right in FIG. 4). Two composite compact pieces, 332 and 334, may be delivered to sandwich the foil (the bottom piece 334 may be supported by a moveable substrate layer, not shown). The resulting three-layer configuration 336 may be slightly compressed by a pair of rollers 317 and then fed into a pair of embossing rollers 307 or matched-die molds to produce bipolar plates 338 (also denoted as 319 in the insert 330 of FIG. 4). This final shaping operation involves an uniaxial compression in the Z-axis direction, possibly with some shearing. This process can be automated for the mass production of bipolar plates.

Example 1

Laminates Comprising Polyethylene-Expanded Graphite Composite Sheets and a Core Copper Sheet A series of composite compacts were prepared for use in laminates as follows:

Sample 1-A: Ultrafine polyethylene (PE) powder, having an average particle size of about 10 μm, was dry-blended with 30% by weight of non-expandable natural graphite particles and 70% by weight of acid-intercalated, expandable graphite (based on the total weight of expandable and non-expandable graphite). The PE amounts were 5, 15, 25, and 50% by weight based on the total weight of the resulting composite composition. The non-expandable graphite was intended as an isotropy-promoting agent. The three-component mixture was enclosed in a quartz tube, which was purged with nitrogen gas and then loosely sealed from both ends of the tube with ceramic cloth. The tube was rapidly transferred to the center of a tube furnace pre-heated to a temperature of 1,100° C. and maintained at that position for 20 seconds. Rapid expansion or exfoliation of the expandable graphite occurred and, surprisingly, the PE did not suffer any significant thermal degradation as would have been expected by polymer scientists. This might have been due to the notion that PE was exposed to high heat for only a very short period of time. It may be noted that the exfoliated graphite herein used comprises graphite oxide since strong acid intercalation tends to partially oxidize natural graphite.

Sample 1-C: The compositions and process conditions were the same as Sample 1-A with the exception that PE powder was added after (rather than before) exfoliation of the expandable graphite.

Sample 1-D: The compositions and process conditions were the same as Sample 1-A with the exceptions that there was no non-expandable graphite in the composite and PE powder was added after (rather than before) exfoliation of the expandable graphite. This was based on a prior art approach.

Sample 1-E: The compositions and process conditions were the same as Sample 1-A with the exception that the amount of non-expandable graphite was 20% with the remaining 10% being replaced with short graphite fibers for the purpose of enhancing mechanical strength of the resulting composite plate.

A desired amount of the various PE-graphite blends was poured into a mold and uniaxially compressed to a pressure of about 5,000 psi (34.5 MPa) to obtain a compact. Two pieces of so-formed compact were used to sandwich a thin copper sheet (approximately 0.3 mm in thickness) to form a three-layer structure. This structure was heated to 160° C., and then cooled to produce thin, flat plates (approximately 0.9 mm thick).

TABLE 1

Conductivity values of laminate comprising two exfoliated graphite-PE composite layers and a copper sheet (each layer approximately 0.3 mm thick).

| Sample | Weight % PE in comp. | Composite in-plane conduc., S/cm | Composite thickness-dir. conduc., S/cm | Laminate thickness-dir. condc., S/cm | Laminate areal condc., S/cm$^2$ |
|---|---|---|---|---|---|
| 1-A | 5 | 1340 | 117 | 175.3 | 1,948 |
|  | 15 | 1210 | 78 | 117.1 | 1,301 |
|  | 25 | 1005 | 76 | 113.6 | 1,262 |
| 1-C | 5 | 1338 | 115 | 172.5 | 1,917 |
|  | 15 | 1211 | 77 | 115.3 | 1,281 |
|  | 25 | 1001 | 76 | 113.6 | 1,262 |
| 1-D | 5 | 1703 | 11.4 | 17.1 | 190 |
|  | 15 | 1328 | 13.3 | 19.9 | 222 |
|  | 25 | 1101 | 15.9 | 23.8 | 265 |
| 1-E | 5 | 1305 | 108 | 161.9 | 1,799 |
|  | 15 | 1105 | 76 | 113.6 | 1,262 |
|  | 25 | 1004 | 72 | 107.9 | 1,198 |

The in-plane conductivity of the three-layer laminates was typically in the range of 1,000-1,340 S/cm. A comparison of the conductivity data between Sample 1-A and Sample 1-D indicates that Sample 1-A is more isotropic, providing a much higher thickness-direction conductivity for the composite sheet and for the resulting three-layer laminate as well. Sample 1-C is also better than Sample 1-D. Sample 1-D was prepared according to a prior art approach, which led to much lower thickness-direction conductivity. Clearly, the presently invented composition is far superior to the prior art exfoliated graphite composite composition that contains no isotropy-promoting agent in the composite and the binder material was added after (rather than before) exfoliation of the expandable graphite. A comparison of the conductivity data between Sample 1-A and Sample 1-E indicates that the addition of graphite fibers in Sample 1-E did not seem to compromise the electrical conductivity of the resulting composite. The flexural strength of the composite in Sample 1-E (45-67 MPa) is higher than that of the composite in Sample 1-A (18.4-25.1 MPa). This implies that different properties can be tailored independently and this class of composite materials and related processes are versatile.

The hydrogen gas permeation flux of all samples comprising a core copper layer is much smaller than $1 \times 10^{-6}$ cm$^3$/

(cm²-s) under a pressure differential of 5 atm. The amount of hydrogen that permeates through a 0.9-mm thick laminate was practically non-measurable. By contrast, the hydrogen permeation rate of 0.9-mm thick composite plates from Sample 1-A under comparable testing conditions was in the range of approximately $1-5 \times 10^{-6}$ cm³/(cm²-s).

Example 2

Laminates Comprising Polyethylene-Expanded Graphite Composites (Bi-Axial and Triaxial Compression, Followed by a Z-Direction Compression) and Nickel Foil Sample 2-A is identical to sample 1-A (15% PE) and Sample 2-D is identical to sample 1-D. However, Samples 2-A and 2-D were subjected to bi-axial compression (the first compression vector is defined as the X-axis direction and the second compression vector is the Y-axis direction) at a pressure of 5,000 psi. A nickel metal sheet (0.2 mm thick) was inserted between two composite layers thus formed to form a three-layer structure, which was followed by a final Z-axis compression (12,500 psi) to form a thin three-layer plate. The samples were consolidated (heated to above 160° C.) and then cooled under a final pressure of 5,000 psi (sample of biaxial compressions only) and 12,500 psi (triaxial compression sample), respectively. The electrical conductivity and areal conductivity values of the laminates are given in Table 2:

TABLE 2

Electrical conductivity of triaxial compression samples.

| Sample | Compression directions | Composite Z-axis conduc., S/cm | Laminate Z-axis conduc., S/cm | Laminate areal condc., S/cm² |
|---|---|---|---|---|
| 2-A | X- and Y-, then Z-axis | 355 | 470 | 5875 |
| 2-D | X- and Y-, then Z-axis | 120 | 160 | 1996 |

A comparison of the conductivity data between Sample 2-A and Sample 2-D indicates that Sample 2-A (containing an isotropy-promoting agent) is more isotropic, providing a much higher thickness-direction (Z-direction) conductivity. Both samples show very impressive thickness-direction conductivity values (335 S/cm and 120 S/cm), which are much greater than that of prior art flexible graphite composites (33 S/cm at best). Again, the hydrogen that permeates through the 0.8-mm thick laminate containing a core metal layer is practically too little to measure.

Sample 3: Exfoliated graphite-metal laminate.

Sample 3-A: Ultrafine zinc powder (approximately 220 nm in average diameter) was prepared by using a twin-arc atomization and gas phase condensation process. This powder was dry-blended with 30% by weight of non-expandable natural graphite particles and 70% by weight of acid-intercalated, expandable graphite (based on the total weight of expandable and non-expandable graphite). The Zn amount was approximately 30% by weight based on the total weight of the resulting composite composition. The non-expandable graphite was intended as an isotropy-promoting agent. The three-component mixture was enclosed in a quartz tube, which was purged with nitrogen gas and then loosely sealed from both ends of the tube with ceramic cloth. The tube was rapidly transferred to the center of a tube furnace pre-heated to a temperature of 1,100° C. and maintained at that position for 20 seconds. Rapid expansion or exfoliation of the expandable graphite occurred. The mixture was uniaxially compressed in a mold to about 5,000 psi to yield a cohered composite. Then, a Zn foil of approximately 0.15 mm was inserted between two layers of the thus-formed composite. The three-layer structure was heated in an inert atmosphere to 425° C., while still under a pressure of approximately 5,000 psi, for 5 minutes and subsequently cooled to room temperature to form a consolidated laminate comprising a core Zn sheet and two metal-infiltrated expanded graphite composite sheets. The thickness-direction conductivity of Sample 3-A laminates was approximately 436 S/cm.

Example 4

Laminates Containing One Thermoset Resin-Expanded Graphite Composite Sheet Bonded to One Copper Sheet Sample 4-A: First, 30% by weight of non-expandable natural graphite particles and 70% by weight of bromine-intercalated, expandable graphite (based on the total weight of expandable and non-expandable graphite) were dried blended. The non-expandable graphite was intended as an isotropy-promoting agent. The mixture was enclosed in a quartz tube, which was purged with nitrogen gas and then sealed from both ends of the tube with ceramic cloth. The tube was rapidly transferred to the center of a tube furnace pre-heated to a temperature of 600° C. and maintained at that position for 30 seconds. Rapid expansion or exfoliation of the expandable graphite occurred. The resulting graphite worms were then mixed with 25% by weight of fine phenol-formaldehyde powder, based on the total weight of the resulting composite composition. The resulting mixture was charged into a mold along with a copper sheet of 0.3 mmm thick, heated to 200° C., and uniaxially compressed to a pressure of 15,000 psi for one hour and further cured at 270° C. for another hour to form a thin two-layer laminate plate. The thickness-direction of the resulting two-layer laminate is approximately 125 S/cm. The hydrogen permeation rate of the resulting two-layer laminate was too little to measure. It was deemed to be much lower than $1 \times 10^{-6}$ cm³/(cm²-s) under a pressure differential of 5 atm.

Example 5

Polymeric Carbon-Expanded Graphite Composite-Copper Laminate

Sample 4-A, retained in a steel mold, was slowly heated to 500° C. for 4 hours and then raised to and maintained at 750° C. for 24 hours in an oxygen-free environment. Phenolic resin, a char-yielding polymer, was carbonized to become a polymeric carbon. The thickness-direction conductivity of the laminate composed of a carbon-bonded composite layer and a copper layer was improved to become 385 S/cm, respectively.

Example 6

Glass-Expanded Graphite Composite-Metal Laminate

In another embodiment of the instant invention, a glass binder-based vermicular glass composite with good electrical conductivity, dimensional stability, and corrosion resistance was prepared as follows: About 18 grams of expandable graphite and 7 grams of non-expandable graphite were mixed and then heat-exfoliated at 1,000° C. to obtain an exfoliated graphite-unexpanded graphite mixture. About 22 grams of a commercially available lime glass powder was blended with this mixture by gentle tumbling. The resulting mixture was equally divided into two parts, which were used to sandwich a stainless steel sheet for forming a three-layer structure. After heating to 920° C. in a steel mold, the three-layer structure was uniaxially compressed to a pressure of about 10,000 psi. Upon cooling back to room temperature, the laminate plate (0.95 mm) exhibits a thickness-direction conductivity of 34 S/cm and a specific areal conductivity of 358 $S/cm^2$, exceeding the DOE specific areal conductivity requirement for a composite bipolar plate.

Example 7

Epoxy Resin-Bonded Expanded Graphite Composite-Metal Sheet Laminate

Sample 7-A: First, 30% by weight of non-expandable natural graphite particles and 70% by weight of bromine-intercalated, expandable graphite (based on the total weight of expandable and non-expandable graphite) were dried blended. The non-expandable graphite was intended as an isotropy-promoting agent. The mixture was enclosed in a quartz tube, which was purged with nitrogen gas and then sealed from both ends of the tube with ceramic cloth. The tube was rapidly transferred to the center of a tube furnace preheated to a temperature of 600° C. and maintained at that position for 30 seconds. Rapid expansion of the expandable graphite occurred, resulting in a compressible mixture of exfoliated graphite worms and non-expanded graphite.

This compressible mixture was impregnated with a mixture of a volatile diluent (acetone with a quantity 3 times the weight of a curing agent) and the curing agent of a two-component epoxy resin. The diluent was used to reduce the viscosity and surface energy of the curing agent, thereby promoting impregnation and wetting of exfoliated graphite with this curing agent. Upon completion of the impregnation procedure, the volatile diluent was removed under a chemical fume hood. The curing agent-impregnated compressible mixture was then impregnated with the epoxide, the second component of the epoxy resin system. Once the interior and exterior surfaces of the pores in exfoliated graphite were wetted with the curing agent, subsequent impregnation or infiltration of the resin was essentially spontaneous. This is a very effective way of impregnating graphite worms.

The composite in Samples 7-A was subjected to bi-axial compression (first compression vector is defined as the X-axis direction and second compression vector is the Y-axis direction) at a pressure of 5,000 psi. A copper sheet was sandwiched between two sheets of the so-formed composite, followed by a final Z-axis compression (12,500 psi) to form a three-layer plate. The thickness-direction electrical conductivity of the laminate is 372 S/cm.

The data again demonstrates that non-expandable graphite particles are an effective isotropy-promoting agent, resulting in exceptional thickness-direction conductivity of exfoliated graphite composites and their laminates. Pre-compressions in one or two directions (X- and Y-direction), prior to the final shaping operation (Z-direction), provides an effective way of producing exfoliated graphite-based bipolar plates with excellent electrical conductivity properties. Again, with a core metal layer, the resulting three-layer laminate is practically impermeable to hydrogen molecules.

In summary, the present invention provides the fuel cell industry with a highly conductive and gas permeation resistant flow field plate or bipolar plate component. The resulting fuel cell system is of lower costs (due to their amenability to mass production) and better performance (due to lower contact resistance and internal resistance and, hence, higher voltage and power output). The presently invented laminate composition has the following additional features and advantages:

(1) The composite sheet and the laminate can be manufactured by using a fast and cost-effective process. The process can be automated and adaptable for mass production. The starting materials are relatively inexpensive graphite-based materials. No expensive and tedious process such as chemical vapor infiltration is required. The resulting bipolar plate or flow field plate is of low cost.

(2) The bipolar plate or flow field plate is of excellent structural integrity and is not subject to the delamination problem commonly associated with multi-layer composites induced by the mis-match in coefficients of thermal expansion and elastic constants.

(3) The bipolar plate obtained from the presently invented laminate composition exhibits excellent electrical conductivity that exceeds the target bipolar plate conductivity value set forth by the US Department of Energy for automotive fuel cell applications. As a matter of fact, no prior art flexible graphite-based composite bipolar plates exhibit a thickness-direction electrical conductivity as high as what is obtained with the instant invention.

(4) The composition may be made into a precursor form (without the final shaping operation) for easy storing, shipping, and handling operations. For instance, a laminate composed of two sheets of uncured resin-infiltrated exfoliated graphite composite and a core metal foil may be stored in a refrigerator, preventing the resin curing reaction from advancing to an undesired extent and, hence, the composition can have a long storage life. The end-user can simply cut the composition into individual pieces, which are molded into bipolar plates when and where the plates are needed.

(5) The laminate comprising a sheet of metal is practically impermeable to hydrogen and oxygen gases. The hydrogen permeation rate is much lower than $1 \times 10^{-6}$ $cm^3/(cm^2\text{-s})$, which meets the target as set forth by the US Department of Energy Hydrogen Economy Initiative and Fuel Cell Manufacturing Initiative.

What is claimed is:

1. An electrically conductive laminate composition for fuel cell flow field plate or bipolar plate applications, said composition comprising a hydrogen permeation resistant metal sheet having two opposed exterior surfaces and a first exfoliated graphite composite sheet bonded to the first of the two exterior surfaces of said metal sheet wherein said exfoliated graphite composite sheet comprises: (a) expanded or exfoliated graphite and particles of non-expandable graphite or carbon, wherein said non-expandable graphite or carbon particles are in the amount of between 3% and 60% by weight based on the total weight of said non-expandable particles and said expanded graphite, and (b) a binder or matrix material forming a cohered sheet, wherein said binder or matrix material is between about 3% and 60% by weight based on the total weight of said first exfoliated graphite composite sheet and the exfoliated graphite composite sheet has a thickness direction conductivity of no less than 50 S/cm, the thickness direction conductivity of the exfoliated graphite composite sheet also being greater than the thickness-direction conductivity of the sheet when the non-expandable graphite or carbon particles are not present, and the in-plane conductivity of the exfoliated graphite composite sheet being less than the in-plane conductivity of the sheet when the non-expandable graphite or carbon particles are not present.

2. The laminate composition as defined in claim 1 further comprising a second exfoliated graphite composite sheet bonded to the second of the two exterior surfaces of said metal sheet wherein said second exfoliated graphite composite sheet comprises: (a) expanded or exfoliated graphite and (b) a binder or matrix material to bond said expanded graphite to form a cohered sheet, wherein said binder or matrix material is between 3% and 60% by weight based on the total weight of said second exfoliated graphite composite sheet and the second exfoliated graphite composite sheet has a thickness direction conductivity of no less than 50 S/cm, the thickness direction conductivity of the exfoliated graphite composite sheet also being greater than the thickness-direction conductivity of the sheet when the non-expandable graphite or carbon particles are not present, and the in-plane conductivity of the exfoliated graphite composite sheet being less than the in-plane conductivity of the sheet when the non-expandable graphite or carbon particles are not present.

3. The laminate composition as defined in claim 2 wherein said second exfoliated graphite composite sheet further comprises particles of non-expandable graphite or carbon, wherein said non-expandable graphite or carbon particles are in the amount of between 3% and 60% by weight based on the total weight of said non-expandable particles and said expanded graphite in either composite sheet.

4. The laminate composition as defined in claim 1 wherein said laminate composition, after molding to form a flow field plate or bipolar plate, has a specific areal conductivity no less than 200 S/cm$^2$.

5. The laminate composition as defined in claim 3 wherein said laminate composition, after molding to form a flow field plate or bipolar plate, has a specific areal conductivity no less than 200 S/cm$^2$.

6. The laminate composition as defined in claim 1 wherein said composition, after molding to form a flow field plate or bipolar plate, has a thickness-direction electrical conductivity no less than 100 S/cm.

7. The laminate composition as defined in claim 3 wherein said composition, after molding to form a flow field plate or bipolar plate, has a thickness-direction electrical conductivity no less than 100 S/cm.

8. The laminate composition as defined in claim 6 wherein said composition, after molding to form a flow field plate or bipolar plate, has a thickness-direction electrical conductivity no less than 200 S/cm.

9. The laminate composition as defined in claim 8, wherein said first exfoliated graphite composite further comprises a reinforcement or filler selected from the group consisting of graphite or carbon fiber, graphite or carbon nano-fiber, nanotube, glass fiber, ceramic fiber, polymer fiber, metal fiber, metal particle, polymer particle, organic particle, inorganic particle, or a combination thereof, wherein said reinforcement or filler is between 0.5% and 30% by weight based on the total weight of expanded graphite and reinforcement or filler.

10. The laminate composition as defined in claim 3, wherein said first exfoliated graphite further comprises a reinforcement or filler selected from the group consisting of graphite or carbon fiber, graphite or carbon nano-fiber, nanotube, glass fiber, ceramic fiber, polymer fiber, metal fiber, metal particle, polymer particle, organic particle, inorganic particle, or a combination thereof, wherein said reinforcement or filler is between 0.5% and 30% by weight based on the total weight of the expanded graphite, particles of non-expanded graphite or carbon, and reinforcement or filler in said first exfoliated graphite composite sheet.

11. The laminate composition as defined in claim 1, wherein said binder or matrix material comprises a polymer, ceramic, glass, metal, carbon, polymeric carbon, asphalt, tar, coal tar pitch, petroleum pitch, mesophase pitch, or a combination thereof.

12. The laminate composition as defined in claim 1 wherein said binder or matrix material is selected from the group consisting of unsaturated polyester resins, vinyl ester resins, epoxy resins, phenolic resins, polyimide resins, bismaleimide resins, polyurethane resins, thermoplastic resins, pyrolyzed resins, and combinations thereof.

13. The laminate composition as defined in claim 2 wherein said binder or matrix material is selected from the group, consisting of unsaturated polyester resins, vinyl ester resins, epoxy resins, phenolic resins, polyimide resins, bismaleimide resins, polyurethane resins, thermoplastic resins, pyrolyzed resins, and combinations thereof.

14. The laminate composition as defined in claim 3 wherein said binder or matrix material is selected from the group consisting of unsaturated polyester resins, vinyl ester resins, epoxy resins, phenolic resins, polyimide resins, bismaleimide resins, polyurethane resins, thermoplastic resins, pyrolyzed resins, and combinations thereof.

15. The laminate composition as defined in claim 1 wherein said composition, after molding to form a plate having a plate thickness direction and a surface plane perpendicular to said plate thickness direction, has a hydrogen gas permeation flux of $<2\times10^{-6}$ cm$^3$/(cm$^2$-s) and an electrical conductivity parallel to surface plane no less than 1,000 S/cm, a thickness-direction conductivity no less than 35 S/cm, or a specific areal electrical conductivity no less than 200 S/cm$^2$.

16. The laminate composition as defined in claim 2 wherein said composition, after molding to form a plate having a plate thickness direction and a surface plane perpendicular to said plate thickness direction, has a hydrogen gas permeation flux of $<2\times10^{-6}$ cm$^3$/(cm$^2$-s) and an electrical conductivity parallel to surface plane no less than 1,000 S/cm, a thickness-direction conductivity no less than 35 S/cm, or a specific areal electrical conductivity no less than 200 S/cm$^2$.

17. The laminate composition as defined in claim 3 wherein said composition, after molding to form a plate having a plate thickness direction and a surface plane perpendicular to said plate thickness direction, has a hydrogen gas permeation flux of $<2\times10^{-6}$ cm$^3$/(cm$^2$-s) and an electrical conductivity parallel to surface plane no less than 1,000 S/cm, a thickness-direction conductivity no less than 35 S/cm, or a specific areal electrical conductivity no less than 200 S/cm$^2$.

18. The laminate composition as defined in claim 1, wherein said composition is molded into a flow filed plate having two primary exterior surfaces having flow field channels on at least one of the two exterior surfaces.

19. The laminate composition as defined in claim 1, wherein said composition is shaped into a plate having a thickness of 0.6 mm or thinner.

20. The laminate composition as defined in claim 2, wherein said composition is shaped into a plate having a thickness of 1 mm or thinner.

21. The laminate composition as defined in claim 3, wherein said composition is shaped into a plate having a thickness of 1 mm or thinner.

22. The laminate composition as defined in claim 1, wherein said exfoliated graphite comprises exfoliated natural graphite, synthetic graphite, highly oriented pyrolytic graphite, graphite fiber, graphitic nano-fiber, graphite oxide, graphite fluoride, chemically modified graphite, or a combination thereof.

23. The laminate composition as defined in claim 2, wherein said exfoliated graphite comprises exfoliated natural graphite, synthetic graphite, highly oriented pyrolytic graphite, graphite fiber, graphitic nano-fiber, graphite oxide, graphite fluoride, chemically modified graphite, or a combination thereof.

24. The laminate composition as defined in claim 3, wherein said exfoliated graphite comprises exfoliated natural graphite, synthetic graphite, highly oriented pyrolytic graphite, graphite fiber, graphitic nano-fiber, graphite oxide, graphite fluoride, chemically modified graphite, or a combination thereof.

25. The laminate composition as defined in claim 1, wherein said metal sheet has a thickness smaller than 0.5 mm.

26. The laminate composition as defined in claim 2, wherein said metal sheet has a thickness smaller than 0.3 mm.

27. The laminate composition as defined in claim 3, wherein said metal sheet has a thickness smaller than 0.3 mm.

28. An electrically conductive laminate composition for fuel cell flow field plate or bipolar plate applications, said composition comprising a hydrogen permeation resistant metal sheet having two opposed exterior surfaces and a first exfoliated graphite composite sheet bonded to the first of the two exterior surfaces of said metal sheet wherein said exfoliated graphite composite sheet comprises: (a) expanded or exfoliated graphite and (b) a binder or matrix material, wherein said expanded or exfoliated graphite and said binder or matrix material form a compressible mixture which is compressed in a predetermined direction to form a predetermined form of composite and wherein said binder or matrix material is between about 3% and 60% by weight based on the total weight of said first exfoliated graphite composite sheet and the exfoliated graphite composite sheet has a thickness direction conductivity of no less than 50 S/cm, the thickness direction conductivity of the exfoliated graphite composite sheet also being greater than the thickness-direction conductivity of the sheet when the non-expandable graphite or carbon particles are not present, and the in-plane conductivity of the exfoliated graphite composite sheet being less than the in-plane conductivity of the sheet when the non-expandable graphite or carbon particles are not present.

29. The electrically conductive laminate composition of claim 28, wherein said compressible mixture further comprises non-expandable graphite or carbon particles serving as an isotropy promoter.

30. An electrically conductive laminate composition for fuel cell flow field plate or bipolar plate applications, said composition comprising a hydrogen permeation resistant metal sheet having two opposed exterior surfaces and a first exfoliated graphite composite sheet bonded to the first of the two exterior surfaces of said metal sheet wherein said exfoliated graphite composite sheet comprises: (a) expanded or exfoliated graphite and (b) a binder or matrix material, wherein said binder or matrix material comprises a ceramic, glass, metal, carbon, polymeric carbon, asphalt, tar, coal tar pitch, petroleum pitch, mesophase pitch, or a combination thereof, and wherein said binder or matrix material is between about 3% and 60% by weight based on the total weight of said first exfoliated graphite composite sheet and the exfoliated graphite composite sheet has a thickness direction conductivity of no less than 50 S/cm, the thickness direction conductivity of the exfoliated graphite composite sheet also being greater than the thickness-direction conductivity of the sheet when the non-expandable graphite or carbon particles are not present, and the in-plane conductivity of the exfoliated graphite composite sheet being less than the in-plane conductivity of the sheet when the non-expandable graphite or carbon particles are not present.

\* \* \* \* \*